United States Patent [19]

Jefferts et al.

[11] Patent Number: 5,134,370

[45] Date of Patent: Jul. 28, 1992

[54] APPARATUS FOR THE DETECTION OF MAGNETIC TAGS

[75] Inventors: Keith B. Jefferts; Philip A. Ekstrom, both of Shaw Island, Wash.

[73] Assignee: Northwest Marine Technology Inc., Shaw Island, Wash.

[21] Appl. No.: 638,769

[22] Filed: Jan. 8, 1991

[51] Int. Cl.⁵ .................. G01R 33/022; G01R 33/04
[52] U.S. Cl. .................................. 324/247; 324/253; 340/573
[58] Field of Search ............ 324/202, 207.12, 207.15, 324/207.16, 207.18, 207.19, 207.26, 219, 225, 226, 234, 236, 238, 244, 245, 247, 253, 254, 255, 260, 261, 262; 340/568, 573, 575, 870.33

[56] References Cited

U.S. PATENT DOCUMENTS

| | | | |
|---|---|---|---|
| 2,958,819 | 11/1960 | Bregar | 324/245 |
| 3,374,787 | 3/1968 | Hatke | 324/682 |
| 3,528,402 | 9/1970 | Abramowitz | 324/219 |
| 4,127,813 | 11/1978 | Hiroshima et al. | 324/202 |
| 4,439,732 | 3/1984 | Hesterman et al. | 324/253 |
| 4,625,842 | 11/1986 | Bell et al. | 324/245 |

Primary Examiner—Kenneth A. Wieder
Assistant Examiner—Warren S. Edmonds
Attorney, Agent, or Firm—Albert J. Breneisen; Kenyon & Kenyon

[57] ABSTRACT

An apparatus detects a magnetic tag implanted in an organism as detector is moved past the organism by detecting a magnetic field difference between two positions. Prior to examination of a specimen under test, the outputs of a plurality of loops detecting magnetic fields are balanced in a uniform magnetic field. As a consequence, when one of the coils is exposed to a different magnetic field than the other of the coils this difference is detected and an alarm is sounded to indicate that the magnetic tag has been detected.

15 Claims, 11 Drawing Sheets

APPARATUS FOR THE DETECTION OF MAGNETIC TAGS

BACKGROUND OF THE INVENTION

The present invention relates to an apparatus for detecting the presence of a magnetic tag and more particularly to a hand-held detector operated by passing the detector through a region proximate to an article in which a tag may be disposed out of plain view.

It is known to provide identification tags, such as coded-wire tags, for organisms. The tags can be implanted in an organism for purposes of identification of the specimen involved. Such tags can be used for the identification of fish, in which case the tags are implanted at any one of a number of locations below the skin layer of the fish. Such fish tags can be very small, on the order of 0.25 mm diameter by 1.05 mm length. The tags can be segments of stainless steel wire which can have some code to be used as an identification for the specimen involved. These tags can be used to collect information regarding such things as fishery management when the tags are implanted in the fish.

Recovery of these small tags usually involves detection of the magnetic nature of the tags. Because of the size of the tags and the biological constraints of the materials used for tags, this has been a difficult proposition. In particular, the biological constraints prevent the use of the best of magnetic materials with the result being that typically tags have a magnetic moment, $\mu_0 M$, of about $10^{-11}$ Weber-meters. Such a tag thus produces a magnetic field B at a useful distance from the tag R of approximately four inches (approximately 0.1 meters) of $B = \mu_0 M / 4\pi R^3 = 8 \times 10^{-10}$ Tesla. For comparison purposes, the magnetic field of the Earth is approximately $B_E = 6 \times 10^{-5}$ T. Thus, the magnetic field produced by the tag at a distance of approximately four inches from the tag is approximately 1/75,000 of the local field due to the Earth at the same point.

It has been known to provide detectors of various geometries to successfully and routinely detect these tags despite the small magnetic field produced by the tags. These detectors operate by detecting a tiny change due to the tag in the much larger but steady local magnetic field that is produced by the Earth. The tiny change in the field is the result of moving the organism which contains the tag, and thus moving the tag, through a sensitive volume of a stationary detector. These detectors are all sensitive only to changes in the local magnetic field. Since the detector does not move, the local field essentially does not change. However, an article passing through the local magnetic field, producing its own magnetic field, changes the local magnetic field. The detector then indicates the presence of such a tag when the detected local magnetic field varies. Furthermore, such stationary detectors also use various combinations of shielding and cancellation to reduce the effects of both natural and man-made variations in the local magnetic field to acceptable levels.

Despite the success of such stationary detectors, there is a need for detectors which avoid the requirement of moving the specimen with respect to the detector. It is desirable to leave the specimen of interest stationary and move a detector over the appropriate part of the specimen. However, this provides a much more difficult problem.

Essentially, an instrument intended to accomplish this must measure the magnetic field as close as possible to the volume of interest and then subtract from that value the value of the magnetic field a short distance away. Such an instrument is called a differential magnetometer or gradiometer. Generally, gradiometers are well known. They are usually implemented with two or more static magnetometers of one of several varieties such as flux-gate magnetometers, optically pumped atomic magnetometers, nuclear magnetic residence magnetometers (free-precession magnetometers), or SQUID (superconducting quantum interference device) magnetometers. However, all of these methods are inappropriate for the task at hand because of their relative complexity, their cost, size or lack of portability.

SUMMARY OF THE INVENTION

The present invention overcomes the shortcomings of the stationary detectors as well as the moving detectors described above. In particular, the present invention provides a plurality of magnetic field detecting coils which have outputs balanced against one another in a uniform magnetic field and in some instances also balanced in a field with uniform gradient. The coils are separated from one another so that at least one coil is disposed closer to the specimen under test than at least a second coil. The coils are moved past the stationary specimen under test. If a tag is present in the specimen in the area under examination, the multiple coils will detect different magnetic fields. The output of the balanced coil system will no longer indicate cancelled fields. Instead, the coils will indicate the detection of a difference between the magnetic fields which effect the different coils. Once the difference is detected, a signal is generated to advise the user of the existence of the additional magnetic field and thus the existence of the magnetic tag in the specimen in question.

In one configuration, two coils can be provided which have parallel coil axes. The coils can be disposed in a coaxial fashion or parallel to one another in a non-coaxial fashion. The output of the respective coils are passed to amplifiers which have predetermined amplification factors previously set so as to produce cancelling signals when the two coils are exposed to a uniform magnetic field. The outputs of the respective amplifiers are summed. The output sum is integrated over a predetermined time. If the coils are disposed in a uniform magnetic field, then the overall output of the device is a null or very small voltage signal indicating the cancellation of the voltages detected by the coil separately. Where one of the coils is exposed to a different magnetic field than the other coil, the sum and integration operations produce a larger output indicative of magnetic field differences. These magnetic field differences indicate that one of the coils has been placed in proximity to a magnetic field producing element such as a tag.

To provide a higher order cancellation, it is possible to provide three or more coils which can be disposed coaxially, or four or more coils in other arrangements, commonly very symmetric ones.

Also, because of the sensitivity required to detect such small magnetic field differences, it is important that the effective axes of the coils in question be parallel so as to make the detectors sensitive to only the component of the local magnetic field which is parallel to the coil axis. The coil sets must have zero sensitivity to components of the local magnetic field which are at right angles to the axis. This can be achieved by a mechanical adjustment of the positioning of the coils to more precisely orient the coils with respect to one another by physically rotating one coil with respect to the other to achieve the necessary rejection in a uniform test field. In an alternative configuration, two additional smaller coils can be oriented mutually perpendicular and at right angles to the principal coil axis. These coils are referred to as trim coils and are operated over an appropriate range of gains. The output of each trim coil amplifier is supplied to the summation device. The equivalent of the mechanical adjustment is thus achieved by the electronic arrangement by properly setting the gains of the variable gain amplifiers associated with the trim coils.

It is also possible to provide a filtering of the output of the detection device to select a frequency range that is appropriate to the operation of the detector. Where the detector is a hand-held or hand operated detector, that frequency range may extend from approximately 2 Hz to about 30 Hz.

DETAILED DESCRIPTION

Figure 2A:
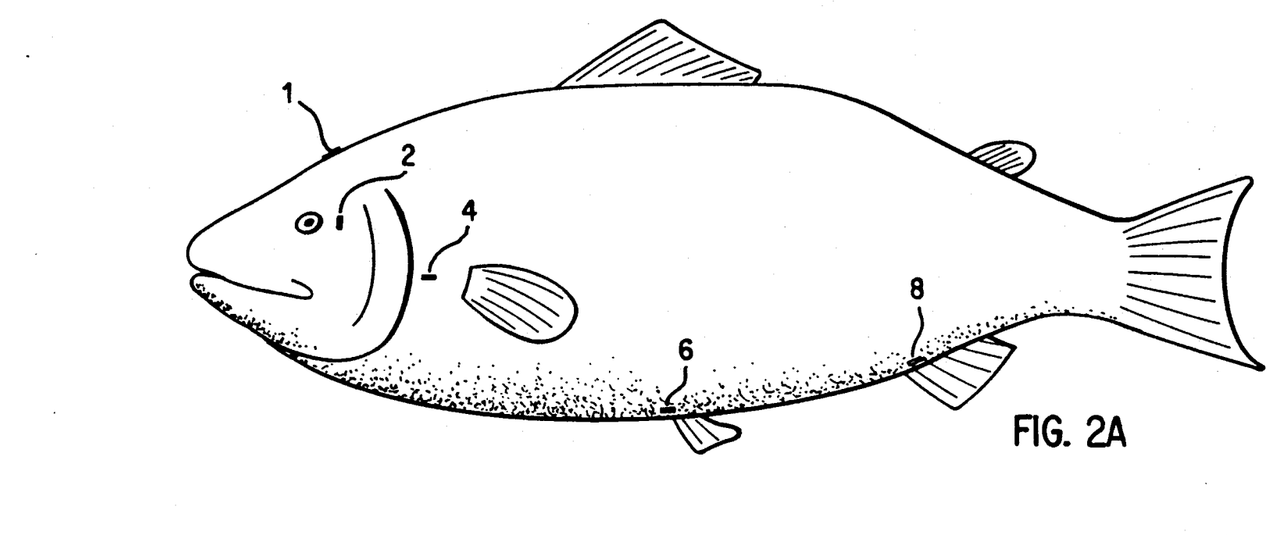
FIGS. 2a and 2b illustrate a possible organism in which tags might be implanted, as well as locations for such implants such that the implants can be detected by the apparatus of the present invention.
Figure 2B:
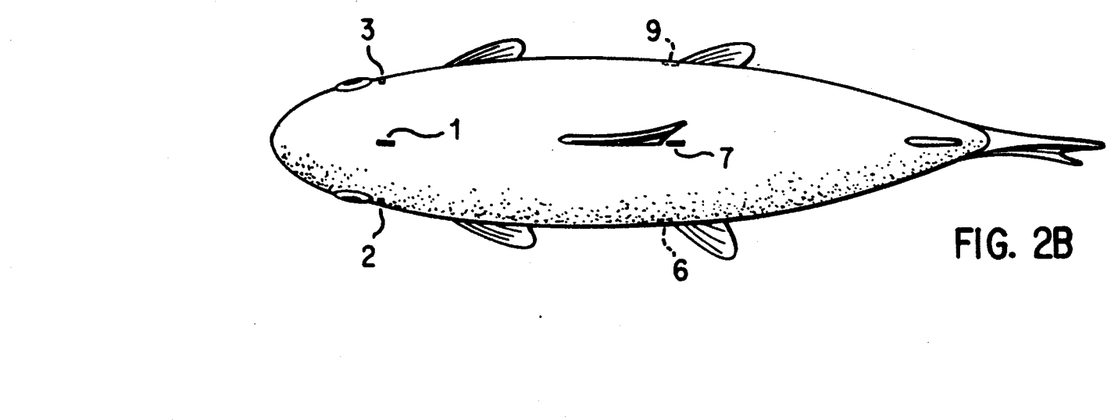

FIG. 2 illustrates an organism in which magnetic tags can be implanted. For instance, such magnetic tags can be implanted in a fish. The magnetic tag can be implanted in a number of locations in the fish as illustrated by reference numerals 1 to 9 of FIGS. 2a and 2b. Depending on the location, the tags can be implanted just below the skin layer of the fish such as at locations 2 and 3, or can be implanted more deeply in the body of the fish such as at point The depth of the implant of the tag, and the size of the magnetic field of the tag will effect the position of the detector required to detect the presence of a magnetic tag in the specimen in question.

Figure 1:
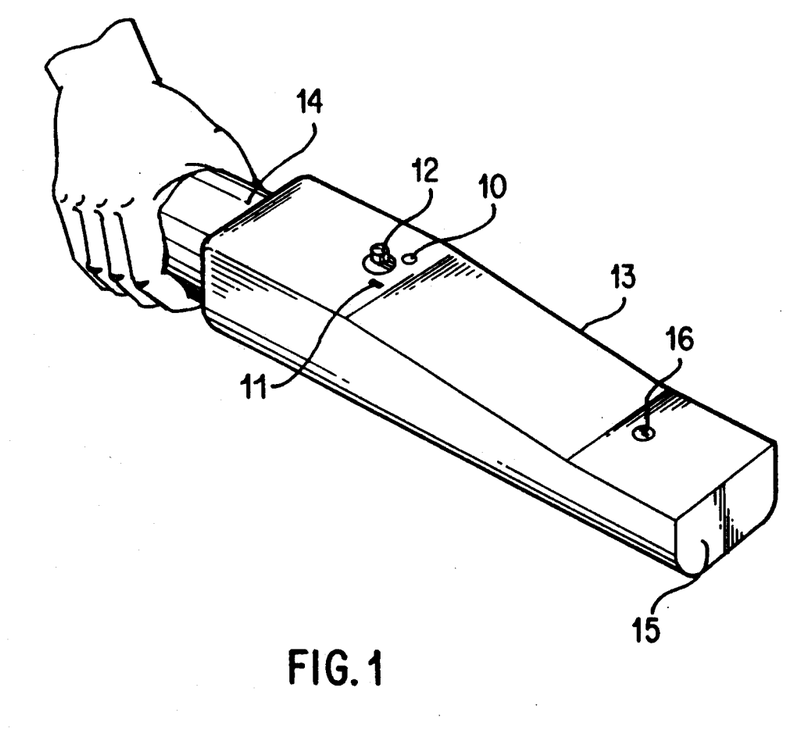
FIG. 1 illustrates an external view of the hand-held tag detector of the present invention.
Figure 8:
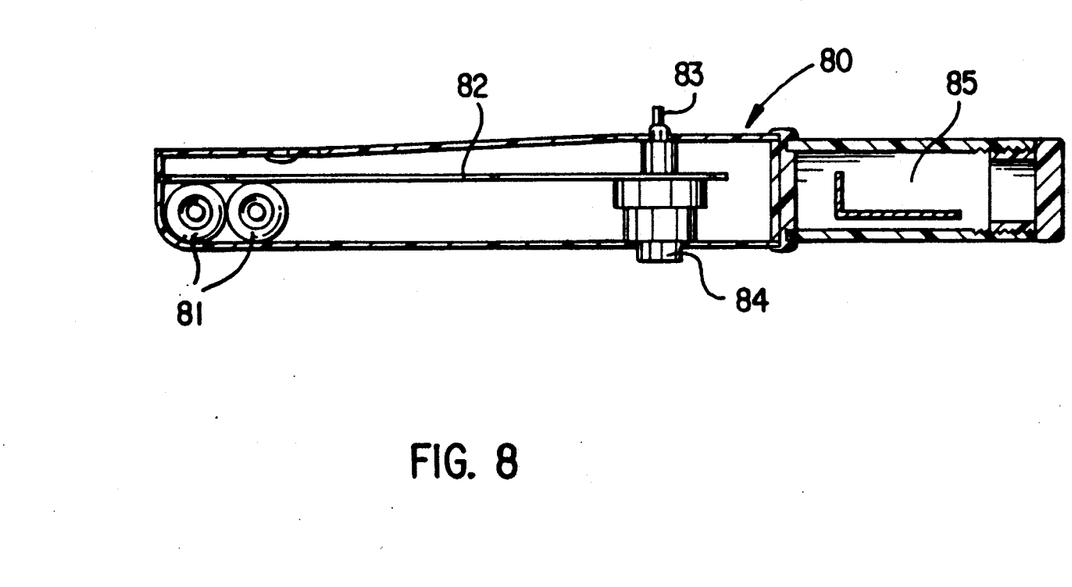
FIG. 8 illustrates a side cross sectional view of the detector of the present invention incorporating the circuitry of FIG. 7.

The present invention operates by detecting a difference in magnetic fields at two points as a detector is moved past a specimen under test. An external view of the detector is illustrated in FIG. 1. The detector has a handle end 14 which can be gripped by a user, an on-off switch 12, on-off indicators 10 and 11, and an extended body 13 that is a housing for the detection circuitry. The housing material may include a plastic that can be vacuum formed or injection molded. End 15 of the detector is brought into proximity with a specimen under test. The maximum distance between the end and the specimen varies depending on such factors as tag size, depth of tag implantation, and coil orientation within the housing. A light emitting diode 16 provides a visual indication of the detection of a tag as the end 15 is brought past the specimen. A piezoelectric buzzer such as that shown as element 84 of FIG. 8, provides an audible indication of detection of the tag.

The operation of the present invention depends on the assumption that where the two or more coils are both subjected to the same magnetic field, the outputs of the coils will cancel. However, where the coils are exposed to different magnetic fields, a difference signal will be produced. This indicates the presence of the tag.

A first embodiment of the present invention will be described with reference to FIG. 3. Two coils 31 and 32 are provided in a coaxial arrangement along the Z axis. Prior to operation as a detector, the coils are exposed to a uniform alternating magnetic field. When exposed to this field, a first voltage $V_1$ is developed across loop 32 while a second voltage $V_2$ is developed across loop 31. The induced voltages are amplified by amplifiers 34 and 33. The output of the respective amplifiers are added together by a linear adder 35 and the sum is integrated with respect to time by integrator 36 to generate an output voltage $V_0$. When exposed to this uniform alternating magnetic field, the geometry of the coils and the electrical characteristics of the amplifiers are adjusted to provide a summation output that indicates a cancellation of the two induced voltages. Thus, the coil configuration is "balanced" or "zeroed" to provide a zero or null output when the two coils are exposed to the same magnetic field at the same time.

After the balancing process is executed, the coils are ready for use in the detection of tags in an organism. In particular, the coils are arranged so that, for instance, coil 31 is positioned closer to the specimen under test while coil 32 is further away from the specimen under test as the detector is moved past the specimen under test. The loops 31 and 32 will again have induced voltages $V_2$ and $V_1$ respectively. However, if a tag is disposed in the specimen near to the position of coil 31 as it passes the specimen, a voltage difference will be detected at the linear adder 35. Thus, the output of the integrator 36 is a signal which is indicative of a difference between induced voltages. The presence of this difference signal is further indicative of the presence of a tag near to the coil that is in proximity to the specimen.

Typically, the voltage induced in a loop of wire due to a changing magnetic field is defined by $E = -N d\phi/dt$ where $\phi$ = magnetic flux through the loop = BA where N = the number of turns around the loop; B = the magnetic flux density; and A = the area of the loop. Thus, $E = NA\, dB/dt$. If that induced voltage is applied to an electronic integrator, such as an operational amplifier with an appropriately chosen feed back element that is characterized by a transfer function $V_0 = K \int V_{IN} dt$, then $V_0 = -KNA \int dB/dt\, dt = -KNA(B_t - B_0)$.

The output of the integrator is thus proportional to the change in magnetic flux density during the period of integration. Search coils operating into a ballistic galvanometer (electromechanical integrator) have been used to measure large magnetic fields for many years. However, the present invention provides two magnetometers each having a basic configuration to form a useful detector for magnetic anomalies such as tags for organisms.

Figures 5, 6:
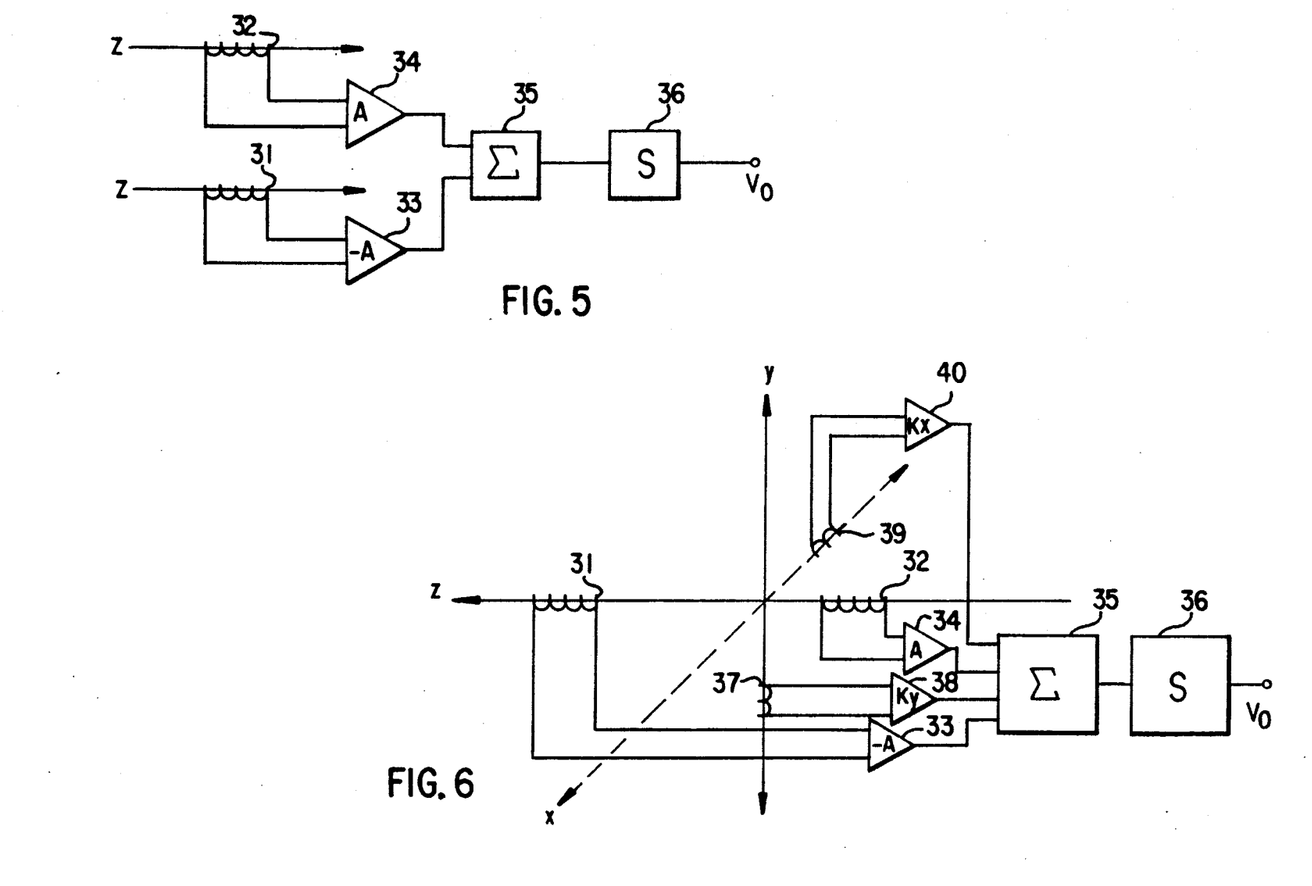
FIG. 5 is a block diagram illustrating a third embodiment of circuitry of the present invention which can be used to detect a tag.
FIG. 6 is a block diagram that illustrates a fourth embodiment of a circuit of the present invention which can be used to detect a tag.

FIG. 5 illustrates another two coil configuration. Again, coils 31 and 32 are arranged to be precisely parallel with one another. However, in this instance, the coils are arranged in a non-coaxial fashion. The fact that they are not coaxially arranged does not negatively affect the operation of the device. In this configuration the two coils are again subjected to the zeroing or balancing operation so that in a uniform alternating magnetic field the resultant output of the circuitry, $V_0$, indicates the field uniformity, that is no detection of a changed magnetic field such as that produced by a tag. When placed in proximity to a specimen which contains such a tag, one of the coils will produce an output voltage which varies sufficiently from the output voltage of the second coil whereby $V_0$ will have a significant non-zero value indicative of the detection of a difference between magnetic fields affecting the loops 31 and 32.

As indicated above, it is important to align the coils to have parallel axes and this alignment operation must be carried out with high precision to enhance the sensitivity of the detection mechanism. This alignment can be effected either mechanically or electrically or by a combination of such actions. The mechanical operation involves physically rotating one coil with respect to the other coil to achieve the desired signal rejection when both coils are disposed in a uniform test field oriented in turn along each of the transverse axes.

An equivalent solution to axis displacement is achieved by including two additional coils in the configuration as illustrated in FIG. 6. In this configuration, loops 31 and 32 are disposed coaxially along the Z axis. They are again connected to amplifiers 33 and 34 respectively. In addition, loop 37 is disposed parallel to the Y axis in the field and loop 39 is disposed parallel to the X axis in the field. A voltage induced in loop 37 is amplified by amplifier 38 while a voltage induced in loop 39 by the field is amplified by amplifier 40. These two coils, 37 and 39, are referred to as trim coils. The output of each amplifier 38 and 40, together with amplifiers 33 and 34, are supplied to the linear adder 35. The gains of the amplifiers can be adjusted in a zeroing or balancing process to provide the electrical equivalent of a precise parallel arrangement of coils 31 and 32.

Figure 3:
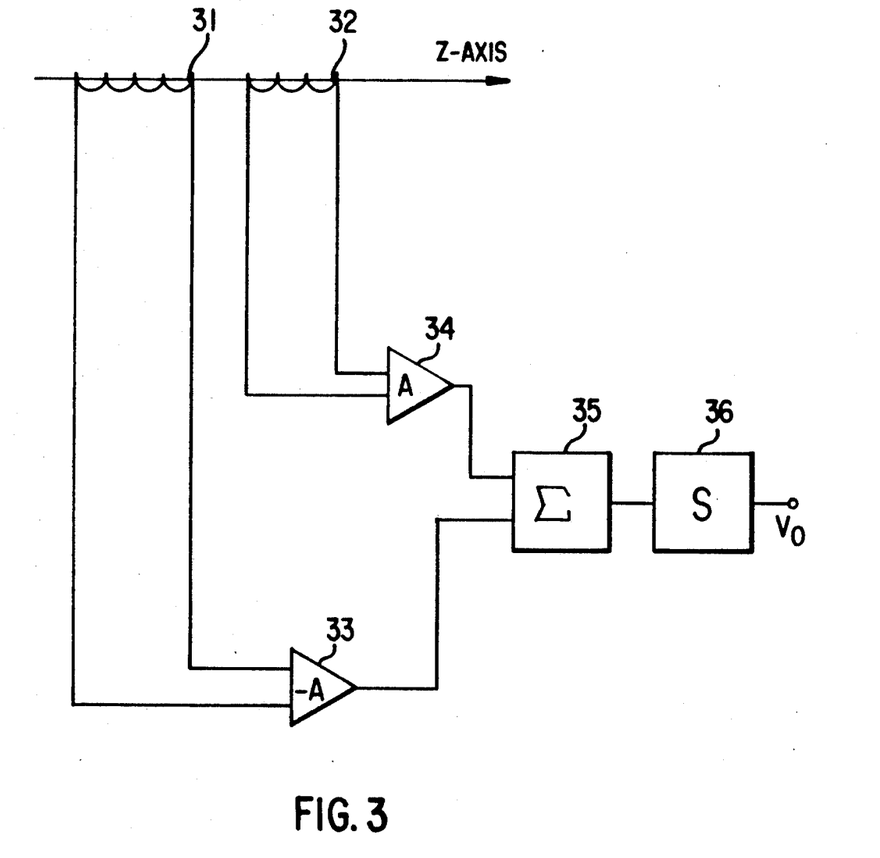
FIG. 3 is a block diagram of a first embodiment of the circuitry of the present invention which can be used to detect a tag.
Figure 4:
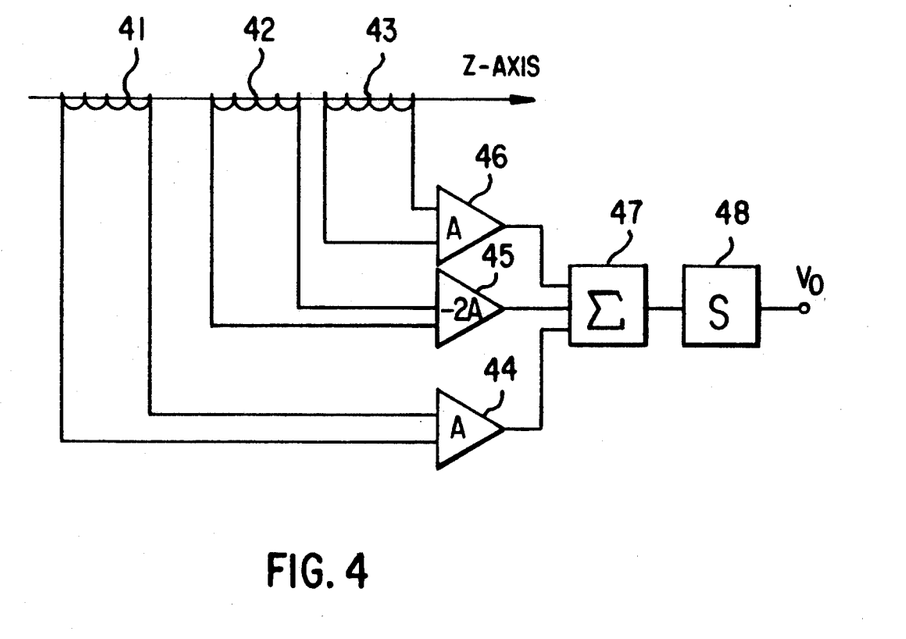
FIG. 4 is block representation of a second embodiment of the circuitry of the present invention to be used to detect a tag.

Another embodiment of the present invention is illustrated in FIG. 4. This embodiment provides a higher order cancellation. In this embodiment, three coils are provided parallel to the Z axis and in the drawing figure are indicated to be in a coaxial arrangement. However, like the relationship between the embodiments of FIG. 2 and FIG. 5, it is not necessary that all three coils be coaxial, only that they extend parallel to one another. Coils 41, 42 and 43 provide their induced voltages to amplifiers 44, 45 and 46 respectively. The output of these three amplifiers is provided to linear adder 47 whose output is then provided to integrator 48. Again, where the output of the circuitry, $V_0$, is zero, this is indicative of a successful cancellation of the effects of the local magnetic field indicating the absence of a tag to be detected. This can be achieved in a balancing or zeroing operation similar to that carried out for the embodiments of FIGS. 3, 5 and 6.

Whereas FIGS. 1 and 3 provide no output when moved or rotated in a uniform magnetic field, FIG. 2 provides no output where the magnetic field is no longer uniform so long as the gradient of the magnetic field is uniform. Thus, the configuration of FIG. 2 provides a greater sensitivity as the detector is passed through a magnetic field with an otherwise constant gradient, the tag may still be detected.

Figure 7:
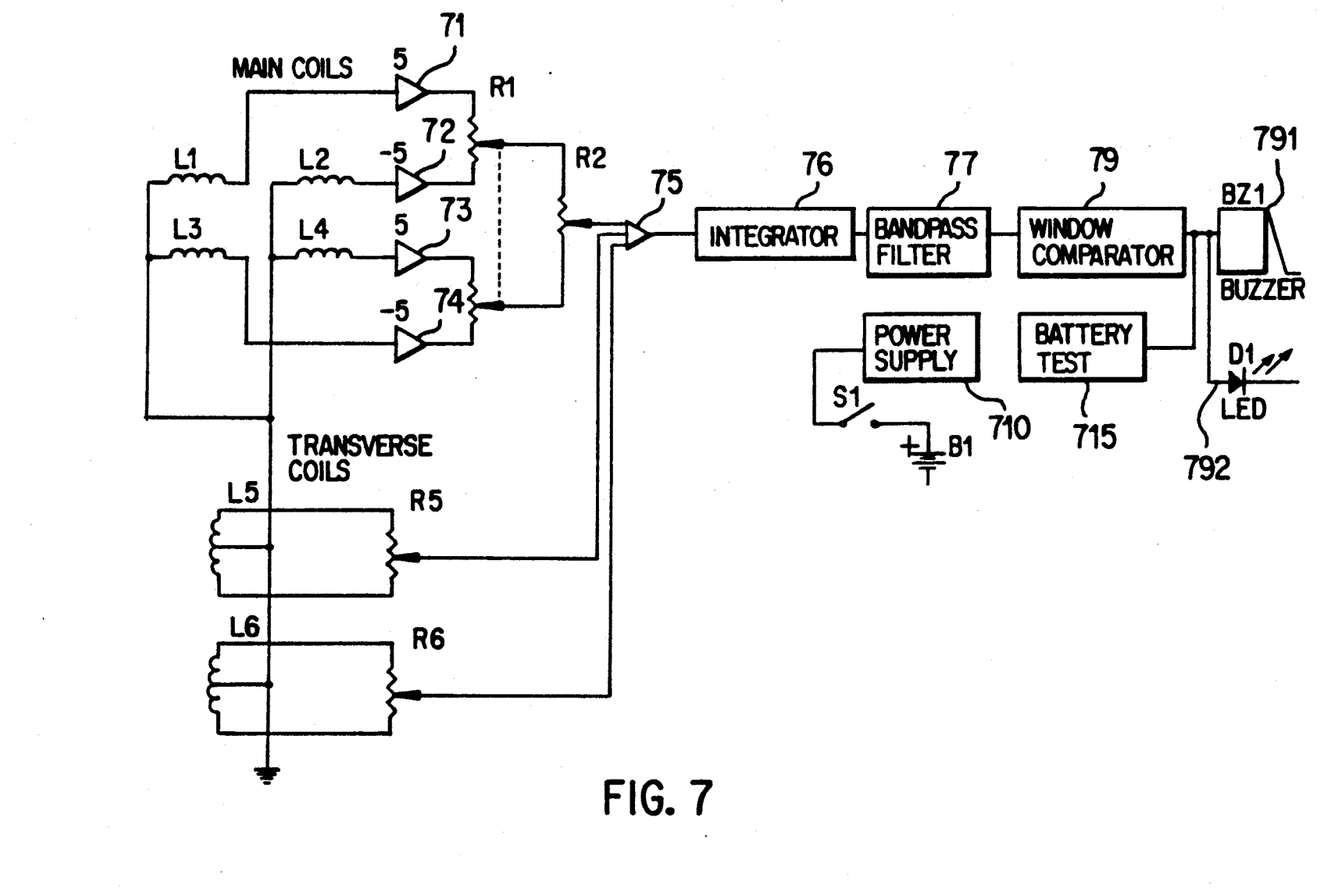
FIG. 7 illustrates a block diagram of a fifth embodiment of a circuit of the present invention which can be used to detect a tag.

FIG. 7 illustrates yet another embodiment of the circuit of the present invention. In this embodiment, four main pickup coils, L1 through L4, feed into buffer amplifiers 71, 72, 74 and 73, respectively. The pickup coils and their respective amplifiers are made as symmetrically as can be conveniently be done so that their signal will be as nearly as possible identical when immersed in the same external magnetic field. The coil outputs are buffered before connecting the signal path to the adjustment potentiometers R1 and R2. Two of the buffer amplifiers, 72 and 74, invert the coil signals so that any adjacent pair of coils contribute to the net signal in an opposite phase and their contributions tend to cancel. The ganged pair of potentiometers R1 adjust the positively weighted coils of each pair against the negatively weighted coils. By properly setting this adjustment, one can make the output zero in any uniform magnetic field. The second adjustment R2 adjusts the pairs against each other. This can be used to achieve zero response in a field with uniform gradient.

Additionally, two transverse coils, L5 and L6, may be provided. These coils are smaller and make a smaller contribution due both to their smaller size and to the fact that the signal paths leading from them lack the gain provided by the buffer amplifiers 71 to 74.

Signals from all six coils are combined in adder 75 and are integrated by integrator 76. This provides a signal that is proportional to the magnetic field rather than to its rate of change with time. A band pass filter 77 rejects signal and interfering frequency components which lie outside of the band containing the majority of tag signal energy. In practice, the band pass extends between 4 and 14 Hz. Also, in practice, a large amount of gain is built into the combining amplifier 75, the integrator stage 76 and the filter 77. The output of the band pass filter passes to a window comparator 78 where any signal excursion, either positive or negative, beyond preset limits, is detected and applied to signal indicators 791 and 792. These indicators are a buzzer 791 and a light emitting diode 792 which communicate to the user that a difference signal has been detected. The threshold of the window comparator 79 is usually set to a value equal twice that of the point where random thermal noise in the pickup coils and other background noise in the preamplifiers would otherwise cause false triggering of the window comparator.

A power supply 710 provides regulated voltages for the circuitry to use. The battery test circuit 715 provides an indication, via indicators 791 and 792, when power is turned on if the battery voltage is high enough to guarantee that enough energy remains in it for eight hours of operation.

FIG. 8 illustrates a side cross sectional view of the detector of the present invention incorporating the circuitry of FIG. 7. In particular, the housing 80 holds the coil set 81, the circuit board 82, on/off switch 83, the buzzer signal indicator 84, and the battery compartment for providing power to the device 85. The size and spacing of the coils in the detector head are a compromise between detection range and interference rejection. Since the interfering magnetic field due to the earth and distant iron objects varies relatively little with position, the coils are placed fairly close together so that all coils in the head lie in approximately the same field. By forming differences between the signals from carefully matched coils, the signal due to any field which is the same at the location of each coil is cancelled out. The magnetic field of a nearby source such as a tag varies relatively rapidly with distance from the source and will not have the same magnitude at the site of each coil unless the coils are too close together. The coils are thus placed far enough to detect differences between the magnetic field from a nearby source while still being close enough together to reject interference.

The optimum coil size and spacing depends on the nature of the interference field to be rejected and on the desired detection range. It has been found that coils having approximately a one inch diameter, spaced about one inch apart, work well together in the intended environment while detecting tags implanted in fish. Coils with size and spacing half again that large have been found not to reject interference sufficiently in one particular set of conditions tested. Other environments and other applications may lead to a different optimum coil scale.

As illustrated in FIGS. 7 and 8, this embodiment utilizes a detector coil assembly including two side-by-side pairs of coils. The pairs of coils are balanced using ganged potentiometers $R_1$ so as to reject uniform magnetic fields, and simultaneously the pairs are balanced against each other using potentiometer $R_2$ so as to reject uniform gradients. As a result, interfering signals are rejected not only if they are uniform over the coil assembly but also if they vary linearly over that region. This is thus a second order gradiometer that is sensitive not to the field gradient itself, but to the gradient of the gradient, the second derivative with respect to position.

The embodiment of FIG. 7 is balanced by immersing it in an AC magnetic field which is precisely uniform and by adjusting the relative gain of a pair of signal paths by adjusting the ganged potentiometers R1 until the detector array gives a zero output. Then, the array is immersed in a precisely generated linear gradient field and another pair of current paths is adjusted to again provide a zero output. If the coil array were mechanically perfect, that would achieve the desired result. In fact it nearly does, requiring only two additional adjustments adding small amounts of signal from coils oriented in directions traverse to the main coils, L5 and L6, in order to compensate for coil tilt, etc. Each adjustment is again made to zero the array output, this time, when the array is immersed in a field along one of the transverse directions.

Figure 9:
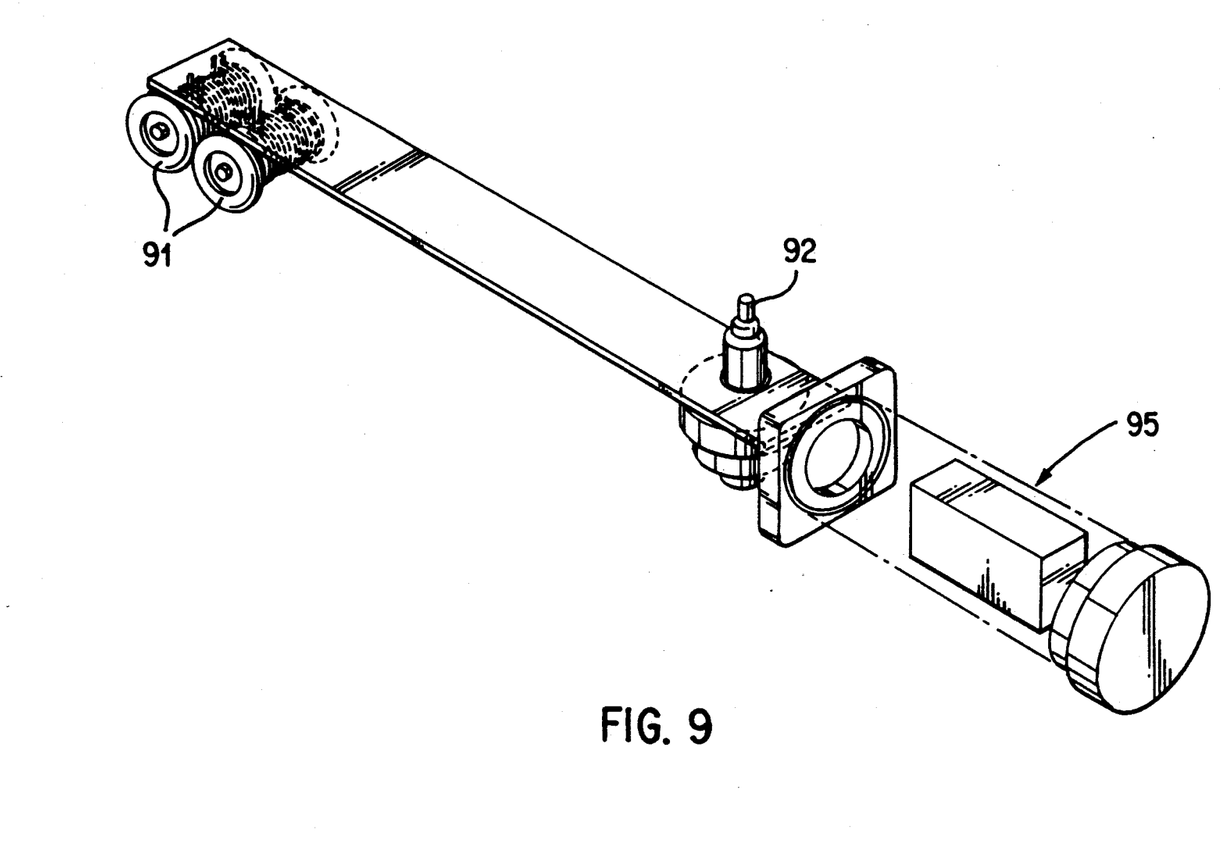
FIG. 9 illustrates the components within the housing of the detector of FIG. 8.

FIG. 9 illustrates components of the embodiment illustrated in FIGS. 7 and 8 without the housing. This includes the coil set 91, the on/off switch 92 and the battery area 95.

Figure 10A:
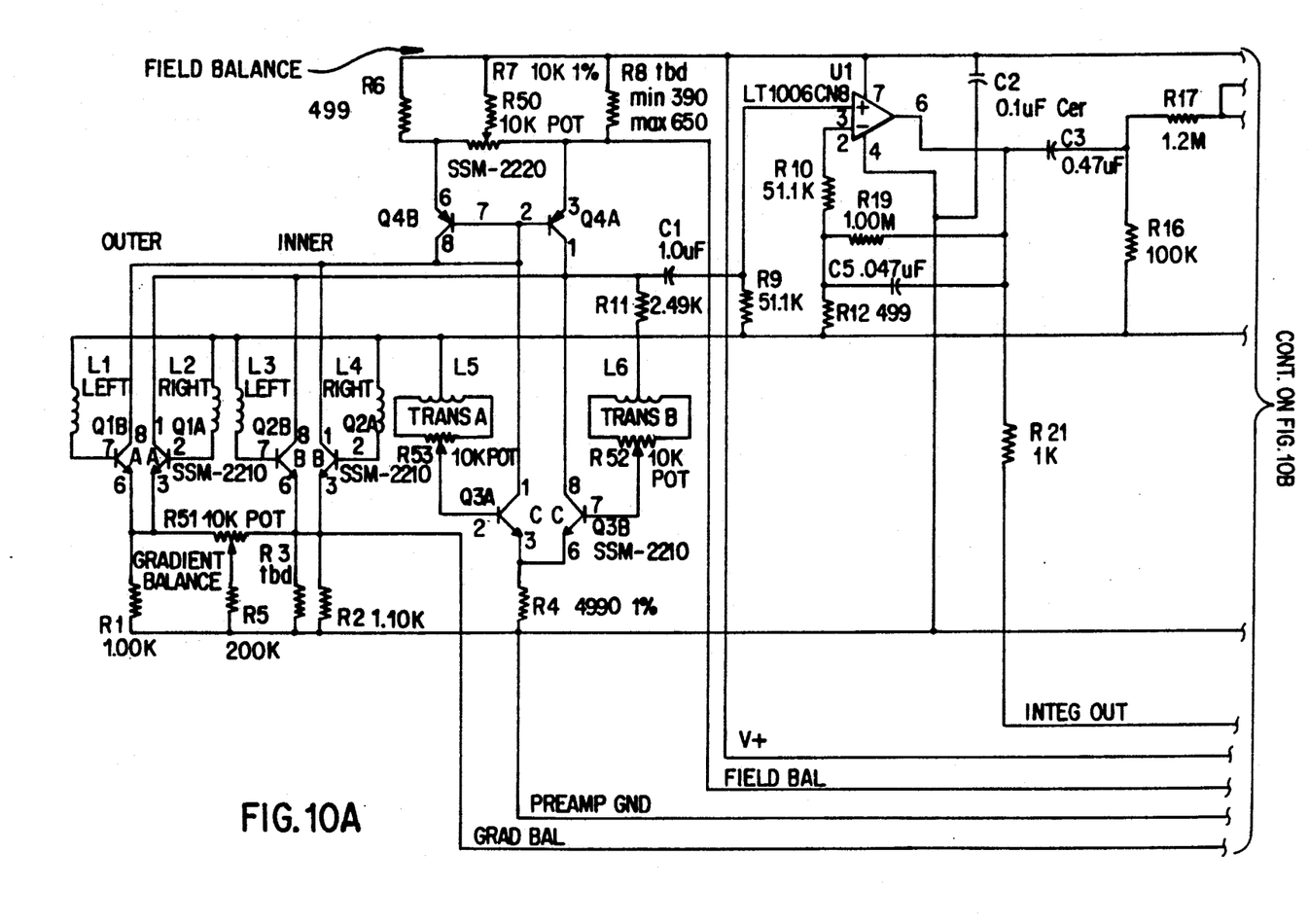
FIGS. 10A-10C illustrate a schematic diagram of the embodiment of FIG. 7.
Figure 10B:
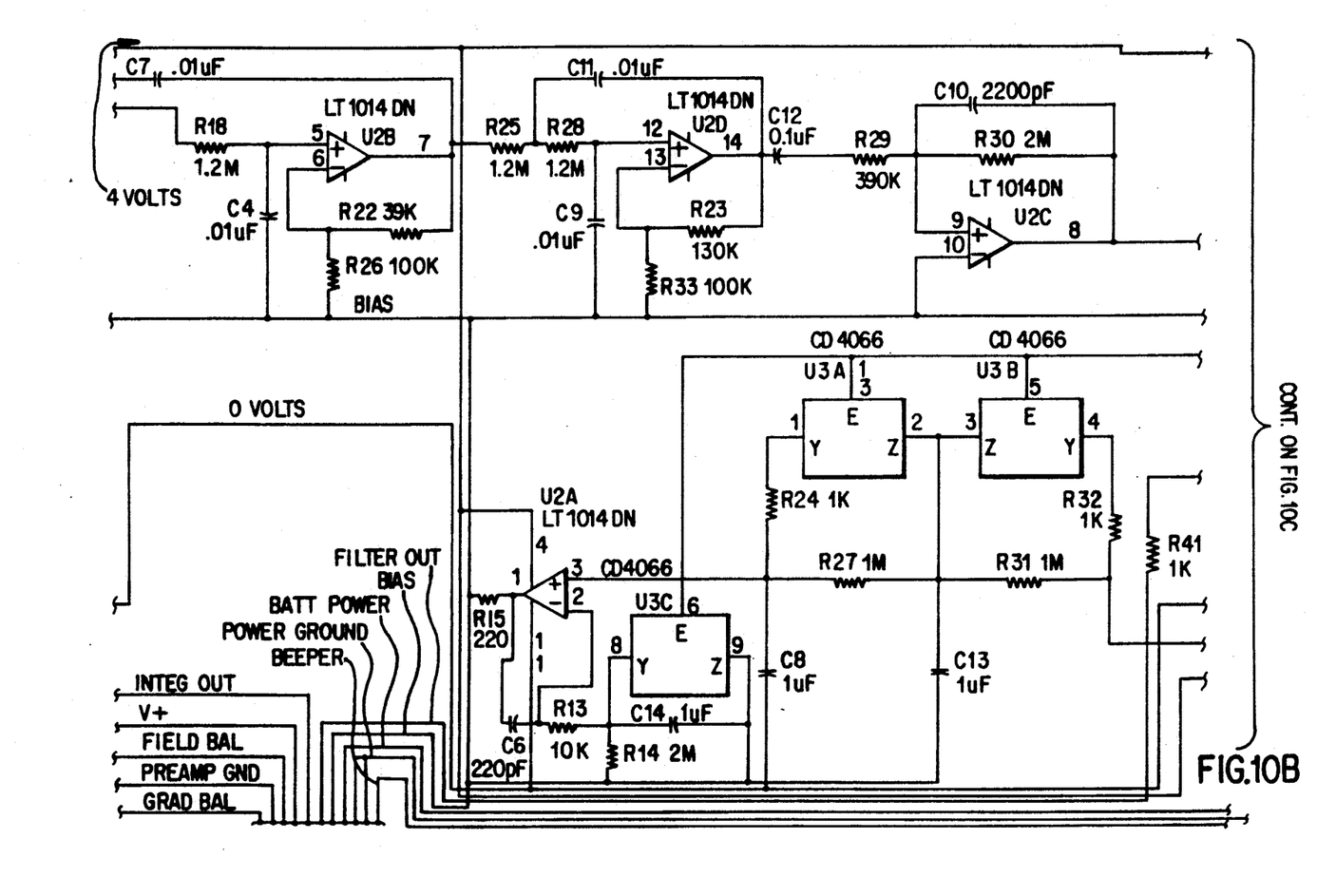
Figure 10C:
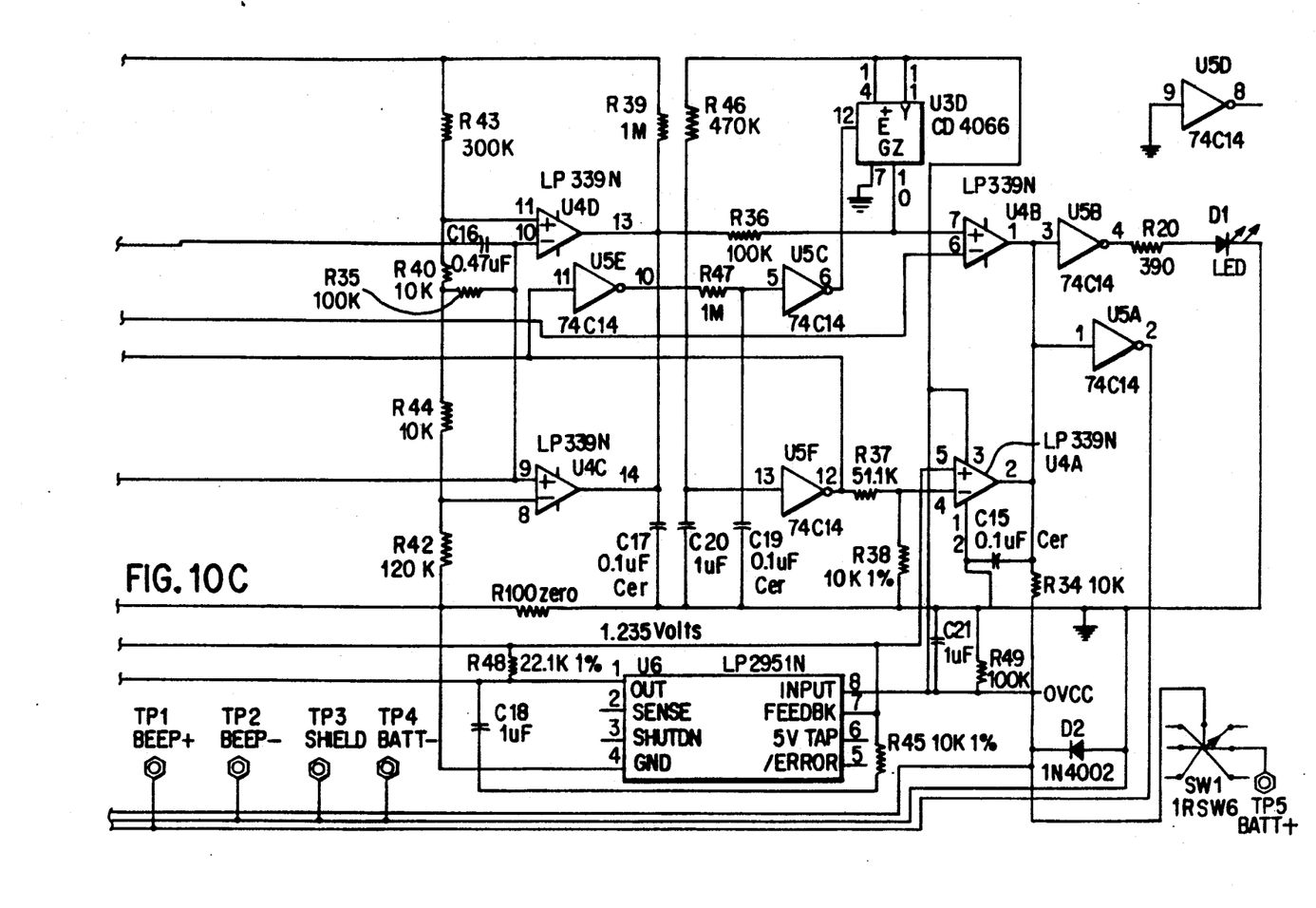

FIGS. 10A–10C provide schematic diagrams of the specific circuitry involved in the embodiment of FIG. 7. That circuitry and the operation of that circuitry are described below.

Signals induced in the pickup coils tend to be very small and a low-noise amplifier is required. Furthermore, it is necessary to buffer the main pickup coils and provide for balancing adjustments. The best low-noise amplifiers in this frequency range for achievable coil impedances near 1K Ohm are bipolar transistor pairs. Accordingly, two such pairs, Q1 and Q2, form the basis for the preamplifier.

The pairs are biased from a regulated voltage of 1.235 volts, the extrapolated band gap voltage of silicon. That particular voltage is conveniently provided by commercial regulator ICs, and for a differential amplifier with a resistive tail, such as Q1 and Q2, results in a stage gain that is independent of temperature. The usual increase in gain with decrease in temperature is balanced by a decrease in tail current as the emitter-base voltage increases and less appears across the tail resistors R1 and R3. This cancellation occurs for the same reasons that cause "band gap" reference circuits to be temperature-independent. The result is that the gains set as the result of trimming arrangements will be stable with temperature. The L1–L2 pair of coils is balanced against the L3–L4 pair by trimming the tail resistance. Two trims are provided. The value of R3 is first chosen to get the relative gains approximately correct and then potentiometer R51 is used to make the final adjustments. R51 corresponds to potentiometer R2 in FIG. 7.

Current outputs of the two main differential amplifier stages, and of a third stage used for the transverse trim coil signals, are combined in a current mirror Q4. If that circuit were a perfect 1:1 mirror, then only the differential mode signals at the preamplifier inputs would be passed onto the output. Common-mode signals appearing in the same phase in each of the coils L1 and L2 (or L3 and L4) would be cancelled out. However, the mirror is not exactly 1:1. It is intentionally adjusted to a different ratio and by so doing, one can achieve the other necessary balance adjustment. The gain from one coil, L1, through the collector of Q1B is larger than the gain from that coil through the other collector of the pair. The choice of resistive tailing and a bias voltage of 1.235 volts sets that ratio of gains at a value near 13 to 12. Thus, by adjusting the mirror ratio, one can emphasize the contribution of either the pair L1–L4 or L2–L3. This is again done in two steps, first by choosing a value for R8 and then by adjusting R50. The resulting adjustment is achieved with a single potentiometer, but has approximately the effect of the ganged potentiometer pair R1 in the block diagram. The effect is not exactly as R1, only because the mirror also serves the transverse preamp Q3 and R50, therefore also effects the transverse balance adjustments.

The tail current through Q3 is one-fifth as large as that through Q1 and Q2, resulting in a gain lower by a factor of five.

U1 is the integrator from the block diagram of FIG. 7. The following operational amplifier stages correspond to the band pass filter. In fact, capacitors C1, C3, C12 and C16 with their respective resistive loads provide the low frequency roll off of the filter pass band. U2B and U2D are standard variants of the Sallen and Key active filter, and U2C is a rolled-off gain stage. Each of those contributes to the high frequency roll off.

The window comparator 78 of FIG. 7 corresponds to elements U4C and U4D. The capacitor and pull-up resistor at its output set a minimum length for an indication on detection. U4B detects threshold crossing for the timer and drives the indicators. U4A does the battery test and drives the indicators in parallel with U4B.

Capacitor C20 and resistor R46 provide power-on sequencing together with U5F. Before capacitor C20 has charged up to the threshold of the Schmitt-trigger input of U5F, that section's CMOS output is high. It applies battery voltage to the U4A battery test through an appropriate divider and the indicators operate if there is enough voltage. At the same time, U5E, U5C and U3D prevent the window comparator from activating the indicators. This is for two reasons. First, a contrasting quiet time must be provided if the battery is low and must not let anything else cause an indication if the battery test does not. Second, the 1.235 volt buffer is a very slow, low-pass filter for noise reasons and it is necessary to charge up the capacitors before the detector circuitry can be expected to work properly. U3A, U3B, and U3C, driven by the same power-on signal, take care of doing that relatively quickly. Resistor R47 and capacitor C19 hold off the window comparator's control of the indicators for another tenth of a second before the main power-on signal goes away, letting things settle.

U2A is a bias buffer, another Sallen and Key-style low pass filter. U6 and surrounding circuitry are the power supply which obtains its primary power from a 9 volt transistor battery.

Header P1 brings out various points from the circuit allowing connecting of trial values of R3 and R8, supplying power and monitoring detector signal levels during initial test end adjustment.

The present invention provides the advantage of a portable tag detector which can be operated in a simple fashion by a user. The detector provides simplified coil configuration with visual and/or audio indications provided to the user of the detection of a different signal indicating the presence of a tag in the specimen under test.

These and other benefits of the unique hand-held detector system of the present invention will be apparent to those of ordinary skill in the art based on the description of the present invention provided in the specification and the associated drawings.

What is claimed is:

1. An apparatus for detecting a magnetic tag implanted in a macroorganism comprising:
   a housing;
   a first coil;
   a second coil, having a coil axis parallel to a coil axis of said first coil, and being disposed between said first coil and an end of said housing;
   a first amplifier having its input coupled to said first coil;
   a second amplifier having its input coupled to said second coil;
   an adder receiving as inputs the outputs of said first and second amplifiers; and
   an integrator coupled at its inputs to an output of said adder;
   a first trim coil, having a coil axis orthogonal to the coil axes of said first and second coils;
   a first trim coil amplifier having its input coupled to said first trim coil;
   a second trim coil, having a coil axes orthogonal to a plane defined by the coil axis of said first trim coil and a coil axes of said first and second coils;
   a second trim coil amplifier having its input coupled to said second trim coil; and
   wherein said adder also received as inputs the outputs of said first and second trim amplifiers.

2. The apparatus of claim 1 wherein said first amplifier has a first gain and said second amplifier has a second gain and said first and second gains have values such that when said first and second coils are exposed to a uniform magnetic field said integrator has an output having an absolute value below a first threshold.

3. The apparatus of claim 1 wherein said first amplifier has a first gain, said second amplifier has a second gain, said first trim amplifier has a third gain and said second trim amplifier has a fourth gain, said first, second, third and fourth gains having values such that when said first and second coils and said first and second trim coils are exposed to a uniform magnetic field, said integrator has an output having an absolute value below a first threshold.

4. The apparatus of claim 1 further comprising an indicator coupled to said integrator and producing an indication of detection of a magnetic tag when said integrator produces an output signal having a value exceeding a predetermined threshold.

5. The apparatus of claim 4 wherein said indicator comprises a light emitting diode.

6. The apparatus of claim 4 wherein said indicator comprises a piezoelectric buzzer.

7. An apparatus for detecting a magnetic tag implanted in a macroorganism comprising:
   a housing;
   a first coil;
   a second coil, having a coil axis parallel to a coil axis of said first coil, and being disposed between said first coil and an end of said housing;
   a first amplifier having its input coupled to said first coil;
   a second amplifier having its input coupled to said second coil;
   an adder receiving as inputs the outputs of said first and second amplifier; and
   an integrator coupled at its input to an output of said adder;
   a third coil having a coil axis that is parallel to the coil axes of said first and second coils; and
   a third amplifier having its input coupled to said third coil and its output coupled to an input of said adder.

8. The apparatus of claim 7 further comprising an indicator coupled to said integrator and producing an indication of detection of a magnetic tag when said integrator produces an output signal having a value exceeding a predetermined threshold.

9. The apparatus of claim 8 wherein said indicator comprises a light emitting diode.

10. The apparatus of claim 8 wherein said indicator comprises a piezoelectric buzzer.

11. An apparatus for detecting a magnetic tag implanted in a macroorganism comprising:
    a first main coil pair including a first main coil and a second main coil;
    a second main coil pair including a third main coil and a fourth main coil, wherein said first main coil, said second main coil, said third main coil and said fourth main coils have parallel coil axes;
    a first trim coil having a first trim coil axis perpendicular to said first main coil;
    a second trim coil having a second trim coil axis perpendicular to said first main coil;
    a first amplifier having its input coupled to said first main coil;
    a second amplifier having its input coupled to said second main coil;
    a third amplifier having its input coupled to said third man coil;

a fourth amplifier having its input coupled to said fourth main coil;

first means, receiving outputs of said first, second, third, and fourth amplifiers, for balancing a detector output signal in a uniform magnetic field;

second means, coupled to said first means for balancing, for balancing the detector output signal in a magnetic field having a uniform gradient;

an adder receiving as inputs an output of said second means, an output of said first trim coil and an output of said second trim coil and adding those inputs to produce a sum output signal;

an integrator coupled to said adder, receiving and integrating said sum output signal to produce an integrated difference signal;

a band pass filter coupled to said integrator and filtering said integrated difference signal;

a comparator, receiving the filtered integrated difference signal, comparing the received signal to a threshold value and producing an indicator control signal when the received signal exceeds said threshold value;

an indicator, responsive to said indicator control signal, producing an indication of detection of an implanted magnetic tag.

12. The apparatus of claim 11 wherein said indicator comprises a light emitting diode.

13. The apparatus of claim 12 wherein said second means for balancing comprises a potentiometer coupled to said ganged potentiometer.

14. The apparatus of claim 11 wherein said indicator comprises a piezoelectric buzzer.

15. The apparatus of claim 11 wherein said first means for balancing comprises a ganged potentiometer coupled to said first, second, third and fourth amplifiers.

* * * * *

UNITED STATES PATENT AND TRADEMARK OFFICE
CERTIFICATE OF CORRECTION

PATENT NO. : 5,134,370
DATED : July 28, 1992
INVENTOR(S) : Keith B. Jefferts et al It is certified that error appears in the above-identified patent and that said Letters Patent is hereby corrected as shown below:

| Column | Line | |
|---|---|---|
| ABS. | 2 | After "as" insert --a--. |
| ABS. | 8 | After "coils" insert --,--. |
| 1 | 31 | Change "$10^{-11}$" to --$10^{-11}$--. |
| 2 | 31 | Change "effect" to --affect--. |
| 3 | 60 | After "point" insert --1.--. |
| 3 | 61 | Change "effect" to --affect--. |
| 5 | 16 | After "that is" insert --,-- |
| 6 | 58 | After "on" insert --,--. |
| 8 | 45 | Change "effects" to --affects--. |
| 9 | 58 | Change "axes" to --axis--. |
| 9 | 69 | Change "axes" to --axis--. |
| 10 | 58 | Change "coils" to --coil--. |
| 10 | 68 | Change "man" to --main--. |

Signed and Sealed this

Fifth Day of October, 1993

Attest:

BRUCE LEHMAN

*Attesting Officer*     *Commissioner of Patents and Trademarks*